United States Patent [19]

Liu

[11] Patent Number: 4,891,397
[45] Date of Patent: * Jan. 2, 1990

[54] NUCLEATED THERMOPLASTIC POLYETHERIMIDE ESTER ELASTOMER MOLDING COMPOSITIONS

[75] Inventor: Nan-I Liu, Mt. Vernon, Ind.

[73] Assignee: General Electric Company, Pittsfield, Mass.

[*] Notice: The portion of the term of this patent subsequent to Jul. 1, 2003 has been disclaimed.

[21] Appl. No.: 127,329

[22] Filed: Dec. 2, 1987

[51] Int. Cl.$^4$ .......................... C08K 3/26; C08K 3/34; C08K 5/09; C08K 5/52

[52] U.S. Cl. ..................................... 524/141; 524/377; 524/394; 524/396; 524/397; 524/424; 524/451; 524/487; 524/538; 525/425

[58] Field of Search ................. 525/425; 524/538, 141, 524/377, 394, 396, 397, 424, 451, 487

[56] References Cited

U.S. PATENT DOCUMENTS

| | | | |
|---|---|---|---|
| 3,023,192 | 2/1962 | Shivers, Jr. | 528/300 |
| 3,624,024 | 11/1971 | Caldwell et al. | 524/281 |
| 3,651,014 | 3/1972 | Witsiepe | 528/301 |
| 3,663,653 | 5/1972 | Frohlich et al. | 528/308.7 |
| 3,763,109 | 10/1973 | Witsiepe | 528/301 |
| 3,801,547 | 4/1974 | Hoeschele | 528/301 |
| 3,907,926 | 9/1975 | Brown et al. | 524/258 |
| 3,957,706 | 5/1976 | Light et al. | 524/394 |
| 4,141,927 | 2/1979 | White | 525/432 |
| 4,184,997 | 1/1980 | Wu | 524/494 |
| 4,212,791 | 6/1980 | Avery et al. | 524/539 |
| 4,315,882 | 2/1982 | Hiratsuka et al. | 264/171 |
| 4,321,341 | 3/1982 | Neuberg et al. | 525/437 |
| 4,351,758 | 9/1982 | Lu et al. | 524/227 |
| 4,371,693 | 2/1983 | Wolfe | 525/438 |
| 4,391,938 | 5/1983 | Memon et al. | 524/270 |
| 4,444,931 | 4/1984 | Lu et al. | 524/227 |
| 4,469,851 | 9/1984 | Charles et al. | 525/444 |
| 4,556,705 | 12/1985 | McCready | 528/289 |
| 4,579,884 | 4/1986 | Liu | 523/216 |
| 4,587,272 | 5/1986 | Avakian et al. | 521/86 |
| 4,598,117 | 7/1985 | Liu et al. | 524/444 |
| 4,639,486 | 1/1987 | Liu | 525/425 |
| 4,659,765 | 4/1987 | Liu et al. | 524/447 |

FOREIGN PATENT DOCUMENTS

| | | |
|---|---|---|
| 109123 | 5/1984 | European Pat. Off. . |
| 135904 | 4/1985 | European Pat. Off. . |
| 155841 | 9/1982 | Japan . |
| 8604914 | 8/1986 | PCT Int'l Appl. . |
| 8704447 | 7/1987 | PCT Int'l Appl. . |
| 1592206 | 12/1977 | United Kingdom . |

OTHER PUBLICATIONS

Argus Product Data—Mark® 2180; Mark® 2140; Mark 135-A.
CA 93: 133342e (1980), "Crystalline Polyester Compositions".
CA 87: 6896q (1977), "Polycarbonate Compositions with Improved Electric and Physical Properties".
CA 99: 176931n (1983), "Polyester Molding Compositions".
CA 95: 8330q (1981), "Polyester Compositions for Molding".
CA 100: 69288a (1984), "Polyester Molding Compositions".
CA 100: 52546k (1984), "Polyester Molding Compositions".
CA 100: 52575u (1984)—"Polyester Compositions".

Primary Examiner—John C. Bleutge
Assistant Examiner—David Buttner
Attorney, Agent, or Firm—William F. Mufatti

[57] ABSTRACT

Improved nucleated thermoplastic polyetherimide ester elastomers containing polybutylene terephthalate (PBT) and nucleating agent. PBT and nucleating agent blended with polyetherimide ester elastomers substantially improves crystallization properties of the polyetherimide esters.

15 Claims, No Drawings

NUCLEATED THERMOPLASTIC POLYETHERIMIDE ESTER ELASTOMER MOLDING COMPOSITIONS

BACKGROUND OF THE INVENTION

The present invention relates to improved polyetherimide ester elastomeric compositions, and more particularly, to improved nucleated thermoplastic polyetherimide ester elastomer compositions having increased crystallization temperatures ($T_c$), increased crystallization rates and reduced mold cycle time. These compositions are particularly useful for production of finished polymer products by such techniques as injection molding, blow molding, rotational molding and the like.

Thermoplastic polyetherimide ester elastomer compositions and the method of producing them are known in the art and are available from General Electric Company under the trademark LOMOD ®J. These compositions have many excellent properties which make them particularly useful for extrusion and molding applications, including one or more of the following enhanced properties: stress-strain resistance, toughness/strength, and tensile set at low flexural modulus combined with rapid crystallization rates and excellent moldability as demonstrated by short cycle times and good mold releasability, respectively. Although the crystallization rates of the thermoplastic polyetherimide ester elastomer compositions are relatively rapid, it is always desirable to improve crystallization rates, increase crystallization temperature ($T_c$) and reduce mold cycle time without substantially adversely effecting any other properties. Increases in $T_c$, increases in crystallization rate and/or reduction in mold cycle time create substantial efficiencies in time and reduced costs in manufacturing processes.

The use of nucleating agents, also called crystallization improvers or crystallization promoters, to promote or enhance the crystallization of slowly crystallizable polyester resins such as, poly(ethylene terephthalate), is known. Nucleating agents, such as talc, in poly(ethylene terephthalate), have been used alone or have been combined with other polymers, such as polycarbonates, to make molding compositions having one or more improved characteristics or properties.

In one prior art embodiment, talc has been used as a crystallization promoting agent in very limiting amounts, that is, less than 1 part by weight. For example, in JP 80/52343 (published Apr. 16, 1980) and abstracted in Chemical Abstracts 93(14):133342e, there are disclosed crystalline polyester compositions of a polyester/polycarbonate copolymer with 0.3 part by weight of talc crystallization improver. In another reference, JP 81/32537 (Apr. 2, 1981), Chemical Abstracts 95(2):8330g; glass-reinforced polyester compositions for molding are prepared from poly(ethylene terephthalate) and 0.7 part by weight of talc. In JP 83/93752 (June 3, 12983, Chemical Abstracts 100(8):52546k, there are disclosed polyester molding compositions employing poly(ethylene terephthalate) and crystal nucleating agents, such as 1 part by weight of metal salts of aromatic oxysulfonic acids and/or talc. In JP 83/127756 (July 29, 1983), Chemical Abstracts 100(10):69288a, 0.5 part by weight of talc is employed in polyester molding compositions of poly(ethylene terephthalate) and polycaprolactone. In JP 83/129047 (Aug. 1, 1983), Chemical Abstracts 100(8):52575u, glass-reinforced polyester compositions are disclosed which contain poly(ethylene terephthalate), a condensation product of diphenyl ether or diphenyl thioether and a carbonyl compound, and 1.0 part by weight of a talc nucleating agent.

In another approach, high quantities of talc, in excess of 10 parts by weight, have been employed in polyester compositions. In U.K. 1,592,206, corresponding to German Offen. DE 2,755,950 (June 29, 1978), flame-retardant reinforced thermoplastic poly(ethylene terephthalate)/polycarbonate compositions are disclosed which have a concentration of 10–50% by weight talc and preferably 10–30% by weight talc to effect an appreciable increase in the arc track resistance of the composition. In JP 77/8059 (Jan. 21, 1977), Chemical Abstracts 87(2):68969, a similar resin composition is disclosed which utilizes talc and/or $SiO_2$ in a concentration range of 25–40% by weight. In JP 83/52343 (Apr. 15, 1983), Chemical Abstracts 99(22):176931n, 5 parts by weight of talc is used as a nucleating agent for polyester compositions of poly(ethylene terephthalate), poly(butylene terephthalate) and polycaprolactone.

In still other proposed compositions, intermediate amounts of a nucleating agent between 0.1 to 4–5 parts by weight have been employed in poly(ethylene terephthalate)/polycarbonate compositions. For example, in U.S. Pat. No. 4,587,272, Avakian et al. disclose foamable thermoplastic compositions of polycarbonate alone, or with poly(ethylene terephthalate), a foaming agent and 0.1 to 5.0 parts by weight of a foam nucleating agent to provide a surface for bubble formation. Among the suitable foam nucleating agents included in U.S. Pat. No. 4,587,272 are organic polymeric particulates further comprising an acrylate impact modifier. In EP 135904 (published Apr. 3, 1985), there are disclosed poly(ethylene terephthalate) moldable blends containing graft-modified rubber, 0.1–4.5%, and preferably 0.5–3.5% by weight, of talc, which is said to reduce warping. It has also been discovered by W. F. H. Borman and M. G. Minnick in copending U.S. application Ser. No. 948,275 filed Dec. 31, 1986 and entitled "Improved Nucleated Reinforced Polyester/Polycarbonate Molding Compositions" that the addition of from about 2 to about 10% by weight of talc, to reinforced blends comprising poly(ethylene terephthalate) and poly carbonates substantially improves the physical properties of the compositions and further that by including sodium dihydrogen phosphate in said compositions further improves the physical properties.

It has also been suggested that flexural modulus as well as other physical properties, may be enhanced by blending one or more thermoplastic polyesters with copolyetheresters. For example, Brown et al. in U.S. Pat. No. 3,907,926 disclose an improved copolyetherester and poly(butylene terephthalate)-containing blend which has high Young's modulus at room temperature and above and also possesses good low temperature impact strength and flexibility. Charles et al. in U.S. Pat. No. 4,469,851, disclose copolyetherester and polybutylene terephthalate (PBT) blends having superior melt stability. It has been suggested by Avery et al. in U.S. Pat. No. 4,212,791 that segmented polyester-polyether block copolymers behave synergistically with oligomeric polyester to improve crystallization temperature and rate in a composition having an inert particulate nucleating agent such as, talc, kaolin, $CaCO_3$, $Al_2O_3$, silica and graphite, and poly(alkylene terephthalate). Light et al. in U.S. Pat. No. 3,957,706 provide compositions having a sodium salt of a monocarboxylic acid and a polyetherester elastomer having good compression recovery after deformation and clearness. In U.S. Pat. No. 4,579,884 Liu has prepared blends of a copolyetherester, an aromatic thermoplastic polyester and a clay which are capable of absorbing high energy impact and withstanding high temperatures.

In many cases attempts to improve certain properties of a polyetherimide ester often have an adverse effect on other properties of the polyetherimide esters, and improvements in one property often result in a substantial sacrifice in the performance of the polymer because of the impact of a particular additive of agent on another property of the polymer. Frequently, when agents are used to enhance crystallization in a polyetherimide ester, there is a substantial impact on flexural modulus, i.e., flexural modulus is increased to unacceptable limits. Accordingly, it is desirable to improve the prior art nucleating agents and systems which increase crystallization rate, increase crystallization temperature ($T_c$) and/or reduce mold cycle time without any substantial increase in flexural modulus.

SUMMARY OF THE INVENTION

Accordingly, it is the primary object of the present invention to prepare novel polyetherimide ester compositions.

Another object of the present invention is to provide a polyetherimide ester composition having improved nucleation characteristics without adversely effecting the flexural modulus of the polyetherimide esters to any significant extent.

It is another object of the present invention to provide an improved thermoplastic polyetherimide ester elastomeric composition which produces molded articles having increased crystallization temperature, increased crystallization rate and/or reduced mold cycle time without substantially increasing flexural modulus.

Still another object of the present invention is to provide thermoplastic polyetherimide ester elastomeric molding compositions which are suitable for injection molding, blow molding, rotational molding and other end use applications.

These and other objects are achieved in accordance with the invention, by improved polyetherimide ester elastomer blends which are particularly suited for molding applications.

The blends of the present invention have one or more polyetherimide esters, an inert particulate nucleating agent and poly(butylene terephthalate). In particular, the elastomeric blends of the present invention comprise about 94 to about 97.9 percent by weight of the total composition of one or more polyetherimide esters; about 0.1 to about 1.0 percent by weight of the total composition of inert particulate nucleating agent, and about 2.0 to about 5.0 percent by weight of the total composition of poly(butylene terephthalate). These compositions exhibit an excellent combination of physical properties typified by enhanced crystallization properties or the enhancement of other properties which reduce mold cycle time and/or improve molding properties without any substantial increase in flexural modulus.

Although there is no desire to be limited to any particular theory, the synergistic effect on the nucleation of the polyetherimide ester materials by the addition of poly(butylene terephthalate) and nucleating agent is best conceptualized as a two-step process. The addition of the modifying combination provides convenient sites for the nucleation of the polyetherimide ester to occur. Polyetherimide ester elastomers have a limited number of ready sites for nucleation to occur and have lower $T_c$ and extended mold cycle times than desired. Substantial increases in $T_c$ and reduced mold cycle time arise by the addition of the modifying compounds of poly(butylene terephthalate) and for example, sodium stearate or sodium carbonate.

The second step of the improved polyetherimide ester nucleation process of the present invention is to speed up the nucleation once it has begun, for it is advantageous to minimize the mold cycle time for economic reasons. Additives can have this desirable effect if they can act as a molecular lubricant. Nucleation is a process whereby crystals originate on a nucleating agent in a structured form. Additives with lubricant properties facilitate this orientation process by imparting lubricious properties to crystalline molecules allowing the crystalline molecules to move more easily into the aligned crystalline formation. It is known in the art that certain stabilizers impart the advantageous lubricious properties to the polyetherimide ester crystalline molecules. Further, it is also known that flow promoters, plasticizers, paraffin waxes and mineral oils can impart this advantageous property.

DETAILED DESCRIPTION OF THE INVENTION

The polyetherimide esters of the present invention and the method for making them are disclosed by McCready in U.S. Pat. No. 4,556,705, incorporated herein by reference. Generally, the polytherimide ester compositions comprise the reaction product of (a) one or more low molecular weight diols, (b) one or more dicarboxylic acids, and (c) one or more polyoxyalkylene diimide diacids. Preferred compositions encompassed by the present invention may be prepared from (a) one or more $C_2$–$C_{15}$ aliphatic and/or cycloaliphatic diols, (b) one or more $C_4$–$C_{16}$ aliphatic, cycloaliphatic and/or aromatic dicarboxylic acids or ester derivatives thereof and (c) one or more polyoxyalkylene diimide diacids. The amount of polyoxyalkylene diimide diacid employed is generally dependent upon the desired properties of the resultant polyetherimide ester. In general, the weight ratio of polyoxyalkylene diimide diacid (c) to dicarboxylic acid (b) is from about 0.25 to 2.0, preferably from about 0.4 to about 1.4. The compositions may contain and preferably do contain additional stablizers for even greater stabilization and low temperature impact strength.

Diols which are suitable for preparing the polyetherimide esters for the present invention include both saturated and unsaturated aliphatic, cycloaliphatic dihydroxy and aromatic dihydroxy compounds preferably having a low molecular weight, i.e., having a molecular weight of about 250 or less. Preferred saturated and unsaturated aliphatic and cycloaliphatic diols are those having from about 2 to about 15 carbon atoms ($C_2$–$C_{15}$). Examples of these diols include ethylene glycol; propanediol; butanediol; pentanediol; 2-methyl propanediol; 2,2-dimethyl propanediol; hexanediol; decanediol; 2-octyl undecanediol; 1,2-, 1,3- and 1,4-dihydroxy cyclohexane; 1,2-, 1,3- and 1,4- cyclohexane dimethanol; butenediol; hexenediol and the like. Especially preferred ar 1,4-butanediol and mixtures thereof with hexanediol or butenediol.

Aromatic diols suitable for use in the preparation of the thermoplastic elastomers are generally those having from 6 to about 15 carbon atoms ($C_6$–$C_{15}$). Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl)propane.

Especially preferred diols are the saturated aliphatic diols, mixtures thereof and mixtures of saturated diol(s) with unsaturated diol(s), wherein each diol contains from about 2 to about 8 carbon atoms ($C_2$–$C_8$). Where more than one diol is employed, it is preferred that at least about 60 mole percent, and most preferably at least about 80 mole percent, based on the total diol content, be the same diol.

When used herein the term "diols" include the equivalent ester-forming derivatives thereof. Examples of ester-forming derivatives are the acetates of the diols as well as for example, ethylene oxide or ethylene carbonate.

The dicarboxylic acids which are suitable for use in the preparation of the polyetherimide esters, include aliphatic, cycloaliphatic, and/or aromatic dicarboxcylic acids. These acids are preferably of a low molecular weight, i.e., having a molecular weight of less than about 300; however, higher molecular weight dicarboxylic acids, especially dimer acids, may also be used. The term "dicarboxylic acids" as used herein, includes equivalents of dicarboxylic acids having two functional carboxyl groups which perform substantially like dicarboxylic acids in reactions with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, as the term is used herein, refers to carboxylic acids having two carboxyl groups each of which is attached to a saturated carbon atom. If the carbon atom to which the carboxyl group is attached, is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals or divalent radicals such as, for example, —O— or —$SO_2$—.

Representative aliphatic and cycloaliphatic acids are sebacic acid; 1,2-cyclohexane dicarboxylic acid; 1,3-cyclohexane dicarboxylic acid; 1,4-cyclohexane dicarboxylic acid; adipic acid; glutaric acid; succinic acid; carbonic acid; oxalic acid; azelaic acid; itaconic acid; diethylmalonic acid; allylmalonic acid; dimer acid; 4-cyclohexane-1,2-dicarboxylic acid; 2-ethylsuberic acid; tetramethylsuccinic acid; cyclopentane dicarboxylic acid; decahydro-1,5-naphthalene dicarboxylic acid; 4,4'-bicyclohexyl dicarboxylic acid; decahydro-2,6-naphthalene dicarboxylic acid; 4,4'-methylenebis(cyclohexane carboxylic acid); 3,4-furan dicarboxylic acid; and 1,1-cyclobutane dicarboxylic acid. Preferred aliphatic acids are cyclohexane dicarboxylic acids, sebacic acid, dimer acid, glutaric acid, azelaic acid and adipic acid.

Representative aromatic dicarboxylic acids include terephthalic, phthalic and isophthalic acids; bi-benzoic acid; substituted dicarboxy compounds with two benzene nuclei, such as bis(p-carboxyphenyl) methane; oxybis(benzoic acid); ethylene-1,2-bis-(p-oxybenzoic acid); 1,5-naphthalene dicarboxylic acid; 2,6-naphthalene dicarboxylic acid; 2,7-naphthalene dicarboxylic acid; phenanthrene dicarboxylic acid; anthracene dicarboxylic acid, 4,4'-sulfonyl dibenzoic acid; and halo and $C_1$–$C_{12}$ alkyl, alkoxy, and aryl ring substitution derivatives thereof. Hydroxy acids such as, p(beta-hydroxyethoxy) benzoic acid can also be used provided an aromatic dicarboxylic acid is also present.

Preferred dicarboxylic acids for the preparation of the polyetherimide esters are the aromatic dicarboxylic acids, mixtures thereof and mixtures of one or more dicarboxylic acid with an aliphatic and/or cycloaliphatic dicarboxylic acid, most preferably the aromatic dicarboxylic acids. Among the aromatic acids, those with 8 to 16 carbon atoms ($C_8$–$C_{16}$) are preferred, particularly the benzene dicarboxylic acids, i.e., phthalic, terephthalic and isophthalic acids and the dimethyl derivatives thereof. Especially preferred is the dimethyl ester derivative of terephthalic acid.

Where mixtures of dicarboxylic acid are employed, it is preferred that at least about 60 mole percent, preferably at least about 80 mole percent, based on 100 mole percent of dicarboxylic acid, be the same dicarboxylic acid or ester derivative thereof. As mentioned above, the preferred polyetherimide esters are those in which the dimethylterephthalate is the predominant dicarboxylic acid ester.

Polyoxyalkylene diimide diacids suitable for use in the preparation of the polyetherimide esters are high molecular weight diimide diacids wherein the average molecular weight is greater than about 700, most preferably greater than about 900. They may be prepared by imidization reaction of one or more tricarboxylic acid compounds containing two vicinal carboxyl groups or an anhydride group and an additional carboxyl group which must be esterifiable, and preferably is non-imidizable with a high molecular weight polyoxyalkylene diamine. These polyoxyalkylene diimide diacids and process for their preparation are more fully disclosed in U.S. patent application Ser. No. 665,192, filed Oct. 26, 1984, now abandoned entitled "High Molecular Weight Diimide Diacids and Diimide Diesters of Tricarboxylic Anhydrides", incorporated herein by reference.

In general, the polyoxyalkylene diimide diacids useful herein may be characterized by the following formula:

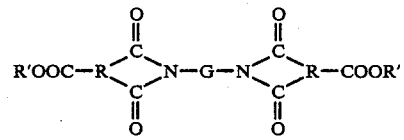

wherein each R is independently a trivalent organic radical, preferably a $C_2$ to $C_{20}$ aliphatic, aromatic or cycloaliphatic trivalent organic radical; each R' is independently hydrogen or a monovalent organic radical preferably selected from the group consisting of $C_1$ to $C_6$ aliphatic and cycloaliphatic radicals and $C_6$ to $C_{12}$ aromatic radicals, e.g. benzyl, most preferably hydrogen; and G is the radical remaining after the removal of the terminal (or as nearly terminal as possible) hydroxy groups of a long chain ether glycol having an average molecular weight of from about 600 to about 12,000, preferably from about 900 to about 4,000, and a carbon-to-oxygen ratio of from about 1.8 to about 4.3.

Representative long-chain ether glycols from which the polyoxyalkylene diamine is prepared, include poly(ethylene ether)glycol, poly(1,2- and 1,3-propylene ether)glycol; poly(tetramethylene ether)glycol; random or block copolymers of ethylene oxide and 1,2-propylene oxide and random or block copolymers of tetrahydrofuran with minor amounts of a second monomer such as, 3-methyltetrahydrofuran (used in proportions such that the carbon-to-oxygen mole ratio in the glycol does not exceed about 4.3). Especially preferred poly(alkylene ether)glycols are poly(ethylene ether)glycol and poly(propylene ether)glycol end capped with poly(propylene ether) glycol and/or propylene oxide.

In general the polyoxyalkylene diamines useful within the scope of the present invention have an average molecular weight of from about 600 to 12,000, preferably from about 900 to about 4,000.

The tricarboxylic component may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further while trimellitic anhydride is preferred as the tricarboxylic component, any of a number of suitable tricarboxylic acid constituents will occur to those skilled in the art including 2,6,7-naphthalene tricarboxylic anhydride; 3,3',4-diphenyl tricarboxylic anhydride; 3,3',4-benzophenone tricarboxylic anhydride; 1,3,4-cyclopentane tricarboxylic anhydride; 2,2',3-diphenyl tricarboxylic anhydride; diphenyl sulfone-3,3',4- tricarboxylic anhydride, ethylene tricarboxylic anhydride; 1,2,5-napthalene tricarboxylic anhydride; 1,2,4-butane tricarboxylic anhydride; diphenyl isopropylidene 3,3',4-tricarboxylic anhydride; 3,4-dicarboxyphenyl-3'-carboxyphenyl ether anhydride; 1,3,4-cyclohexane tricarboxylic anhydride and the like. These tricarboxylic acid materials are characterized in U.S. Pat. No. 4,556,705. In its preferred embodiments, the compositions of the present invention comprise the reaction product of dimethylterephthalate, optimally with up to 40 mole % of another dicarboxylic acid; 1,4-butanediol, optionally with up to 40 mole % of another saturated or unsaturated aliphatic and/or cycloaliphatic diol; and a polyoxyalkylene diimide diacid prepared from a polyoxyalkylene dimine of molecular weight of from about 600 to about 12,000, preferably from about 900 to about 4,000, and trimellitic anhydride. In its most preferred embodiment, the diol will be 100 mole % 1,4-butanediol and the dicarboxylic acid 100 mole % dimethylterephthalate.

The polyetherimide esters described herein may be prepared by conventional esterification and condensation reactions for the production of polyester. Exemplary processes are set forth in U.S. Pat. Nos. 3,763,109; 3,651,014; 3,663,653 and 3,801,547, incorporated herein by reference. Additionally, these compositions may be prepared by such processes and other known processes to effect random copolymers, block copolymers, or hybrids thereof wherein both random and block units are present.

The foregoing polyetherimide ester elastomers are modified in accordance with the teachings of the instant invention by admixing or blending therewith poly(butylene terephthalate) and inert particulate nucleating agents including the metal salts of monocarboxylic acids and dicarboxylic acids, metal salts of aromatic carboxylic acids such as benaoic acid, hydrous magnesium silicates such as talc, and aluminum silicates such as, clay; polyol acetals such as, substituted sorbitol; metal salts of organophosphates such as, sodium di(4-t-butylphenyl) phosphate, and the like.

Generally, the sodium salts are the preferred metal salts of the monocarboxylic and dicarboxylic acids which may be used as nucleating agents, but other metals commonly used to prepare such metal salts may also be used, for example, the potassium salts, the lithium salts and the like. Examples of such acids, the metal salts of which may be used as inert, particulate nucleating agents, include formic, acetic, propionic, butyric, valeric, caproic, caprylic, capric, lauric, myristic, palmitic, stearic, oleic, linoleic, linolenic, cyclohexanecarboxcylic, phenylacetic, benzoic, o-toluic, m-toluic, p-toluic, o-chlorobenzoic, m-chlorobenzoic, p-chlorobenzoic, o-bromobenzoic, m-bromobenzoic, p-bromobenzoic, o-nitrobenzoic, m-nitrobenzoic, p-nitrobenzoic, phthalic, isophthalic, terephthalic, salicylic, p-hydroxybenzoic, anthranilic, m-aminobenzoic, p-aminobenzoic, o-methoxybenzoic, m-methoxybenzoic, p-methoxybenzoic (anisic), oxalic, malonic, succinic, glutaric, adipic, maleic (cis form), fumaric. Preferred metal salts of carboxylic acids include sodium stearate and sodium carbonate. Also, minerals such as hydrous magnesium silicates (talc) and hydrous aluminum silicates (clay) function as inert particulate nucleating agents suitable for use in the practice of the present invention. An example of a commercially available suitable mineral is talc.

While most any amount of the modifying combination of poly(butylene terephthalate) and inert particulate nucleating agent will create a synergistic effect on the nucleation of the polyetherimide ester in order to obtain compositions having the desirable enchanced crystallization property and/or decreased mold cycle time without substantially effecting the flexural modulus, it is necessary that the composition contain from about 94 to about 97.9 percent by weight polyetherimide ester elastomer, about 2 to about 5 percent by weight of poly(butylene terephthalate), and about 0.1 to about 1.0 percent by weight of inert particulate nucleating agent. As used herein, percent by weight is based on the total weight of the composition. In order to obtain the enhanced crystallization properties, it is preferred that the poly(butylene terephthalate) not exceed the amount of the polyetherimide ester elastomer.

While the compositions of this invention possess many desirable properties, it is sometimes advisable and preferred to further modify the compositions against thermal or oxidative degradation as well as degradation due to ultraviolet light. This can be done by incorporating well-known stabilizers into the blend compositions. Satisfactory stabilizers are phenols and their derivatives and compounds containing polymeric phenolic esters.

Representative phenol derivatives useful as stabilizers include tetrakis[(methylene 3-(3',5-di-tertbutyl-4'-hydroxyphenyl)propionate] methane; tetrakis[methylene (3,5-di-tert-butyl-4-hydroxyhydrocinnamate)] methane; octadecyl-3-(3',5'-di-tertbutyl-4'-hydroxyphenyl) propionate; and octadecyl-3,5-di-tert-butyl-4-hydroxyhydrocinnamate. Mixtures of hindered phenols with esters of thiodipropionic acid and phosphite esters are particularly useful.

It is also sometimes desirable to modify the composition by the addition of flow promoters, plasticizers, paraffin waxes and mineral oils to impart lubricious properties to the crystalline or particulate molecules of the blend. Pigments, impact modifiers, flame retardants and the like can also be used to modify the blends of the present invention.

The compositions of the invention may be prepared by any of the well known techniques for preparing polymer blends or admixtures, with extrusion blending being preferred. Suitable devices for the blending include single screw extruders, twin screw extruders, internal mixers such as the Bambury Mixer, heated rubber mills (electric or oil heat) or Farrell continuous mixers. Injection molding equipment can also be used to accomplish blending just prior to molding, but care must be taken to provide sufficient time and agitation to insure uniform blending prior to molding.

Alternative methods include dry blending prior to extrusion or injection molding as well as precompounding of two ingredients, particularly the poly(butylene terephthalate) and an inert particulate nucleating agent(s) prior to mixing with the thermoplastic polyetherimide ester elastomer.

EXAMPLE

The following example is presented to illustrate a preferred embodiment of the invention, but the invention should not be considered to be limited thereto. All parts and percentages are by weight unless otherwise indicated.

The following polyetherimide ester was used in exemplifying the present invention:

The poly(etherimide ester) is derived from 36 parts 1,4-butanediol, 46 parts dimethyl terephthalate and 18 parts imidization product of trimellitic anhydride and TEXACO Chemical Company's Jeffamine ® D2000, a polypropylene ether diamine having an average molecular weight of 2,000. This poly(etherimide ester) is available from General Electric Company under trademark LOMOD ®J.

The $T_c$ is defined as the temperature where the recrystallization peak maximum occurred during cooling at a 20° C. per minute cooling rate of specimen. Larger $T_c$ values indicate greater efficiency of the additives for improving crystallization behavior.

In the Example, the ingredients shown in the Table were blended with each other at room temperature. The blend consisting of the ingredients in the Table below, was fed into an extruder (2.5 inch vented) at a temperature of 430° F. The extrudate was then comminuted into pellets or other suitable shapes. This mixture was then fed into a conventional molding machine. The molding temperature may be from about 410° F. to about 480° F. with the mold temperature being from about 80° F. to 150° F.

Five (5) different blends were prepared from the ingredients specified in the Table to illustrate the invention and were molded as described above. The $T_c$ was determined for the particular blends as shown. R51 and Irganox 1010 are conventional stabilizers.

TABLE

| POLYETHERIMIDE ESTER BLEND COMPOSITIONS | | | | | |
|---|---|---|---|---|---|
| LOMOD ® J | 99.5 | 99.0 | 99.0 | 94.0 | 94.0 |
| R51 | 0.3 | 0.3 | 0.3 | 0.3 | 0.3 |
| IRGANOX 1010 | 0.2 | 0.2 | 0.2 | 0.2 | 0.2 |
| Na Stearate | — | 0.5 | — | — | 0.5 |
| Na$_2$CO$_3$ | — | — | 0.5 | 0.5 | — |
| PBT | — | — | — | 5.0 | 5.0 |
| T$_c$ | 165.7 | 161.5 | 168.4 | 175.0 | 172.3 |

It is clear from the data of Table 5 that the blends representing a combination of the inert particulate nucleating agent, sodium carbonate or sodium stearate, with poly(butylene terephthalate) (PBT) imparts better physical properties (increased $T_c$) than those blends using nucleating agent alone.

Although the present invention has been described with reference to the foregoing specification, many modifications, combinations and variations of the invention will be apparent to those skilled in the art in light of the above teachings. It is therefore understood that changes may be made to the particular embodiments of the invention, which are within the full intended scope of the invention as defined by the following claims.

What is claimed is:

1. A thermoplastic molding composition comprising about 94 to about 97.9 percent by weight polyetherimide ester elastomer, about 0.1 to about 1.0 percent by weight inert, particulate nucleating agent selected from the group consisting of metal salts of monocarboxylic acids, metal salts of dicarboxylic acids, hydrous magnesium silicates, metal salts of organophosphates, sodium carbonate and polyol acetals, and about 2.0 to about 5.0 percent by weight poly(butylene terephthalate), percent by weight based on the total weight of the composition.

2. The composition of claim 1 wherein the polyetherimide ester elastomer is derived from:
   a. one or more diols;
   b. one or more dicarboxylic acids or derivatives thereof, and
   c. one or more polyoxyalkylene diimide diacids.

3. The composition of claim 2 wherein at least about 80 mole percent of the diol in the composition is the same diol and at least about 80 mole percent of the dicarboxylic acid in the composition is the same dicarboxylic acid.

4. The composition of claim 3 wherein the derivative of dicarboxylic acid is dimethyl terephthalate and comprises at least about 80 mole percent of the dicarboxylic acid in the composition.

5. The composition of claim 2 wherein the derivative of the dicarboxylic acid is selected from the group consisting of hexahydrophthalic anhydride, dimer acid and dimethyl terephthalate.

6. The composition of claim 2 wherein the polyoxyalkylene diimide diacide component is derived from one or more polyoxyalkylene diamines and one or more tricarboxylic acid compounds containing two vicinal carboxyl groups or an anhydride group and an additional carboxyl group, and is characterized by the following formula:

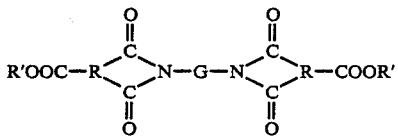

wherein R is independently selected from the group consisting of $C_2$ to $C_{20}$ aliphatic and cycloaliphatic trivalent organic radicals and $C_6$ to $C_{20}$ aromatic trivalent organic radicals; R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of about 400 to about 12,000.

7. The composition of claim 6 wherein the polyoxyalkylene diimide diacid is such that R is a $C_6$ trivalent aromatic hydrocarbon radical, R' is hydrogen, and G is the radical remaining after removal of the hydroxy groups of a long chain either glycol having an average molecular weight of about 900 to about 4,000.

8. The composition of claim 1 wherein the polyetherimide ester elastomer is derived from:

a. one or more $C_2$ to $C_{15}$ aromatic, aliphatic or cycloaliphatic diols;

b. one or more $C_4$ to $C_{16}$ dicarboxylic acids or derivatives thereof having a molecular weight of less than about 300; and c. one or more polyoxyalkylene diimide diacids, wherein
   (i) at least about 60 mole percent of the diol in the composition is the same diol; and
   (ii) at least about 60 mole percent of the dicarboxylic acid in the composition is the same dicarbosylic acid.

9. The composition of claim 8 wherein the derivative of the dicarboxylic acid is dimethyl terephthalate and comprises at least about 60 mole percent of the composition.

10. The composition of claim 1 wherein the inert, particulate nucleating agent is sodium stearate.

11. The composition of claim 1 wherein the inert, particulate nucleating agent is talc.

12. The composition of claim 1 wherein the inert, particulate nucleating agent is sodium di(4-t-butylphenyl)phosphate.

13. The composition of claim 1 wherein the inert, particulate nucleating agent is a metal salt of benzoic acid.

14. The composition of claim 13 wherein the inert, particulate nucleating agent is sodium benzoate.

15. The composition of claim 1 further comprising about 2 to about 4 percent by weight of the total composition of at least one additive selected from the group consisting of a flow promoter, a plasticizer, a paraffin wax, mineral oil and mixtures thereof.

* * * * *